United States Patent Office 3,402,190
Patented Sept. 17, 1968

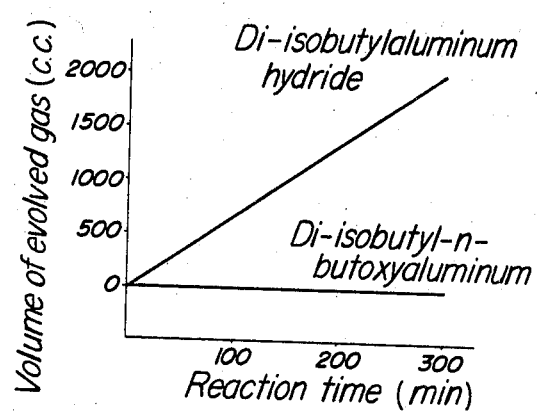

3,402,190
METHOD FOR MANUFACTURING ALKYL-
ALUMINUM COMPOUNDS
Kiyoshi Toyoshima, Hirosuke Ryu, Atsuro Matsui, and
Eiichi Ichiki, Niihama-shi, Japan, assignors to Sumitomo
Chemical Company, Ltd., Osaka, Japan, a corporation
of Japan
Filed June 16, 1964, Ser. No. 375,484
Claims priority, application Japan, June 18, 1963,
38/32,101
5 Claims. (Cl. 260—448)

ABSTRACT OF THE DISCLOSURE

A method for activating inactive aluminum and inactive aluminum alloys by heating the same with an agent comprising an organooxymetal; preparing alkyl aluminum compounds by reacting said inactive aluminum or aluminum alloy with said organooxymetal and a mixture of alkyl aluminum compound and hydrogen or a mixture of an alkyl aluminum compound, hydrogen and an olefin.

This invention is concerned with a method for activating aluminum or alloys containing the same and with a method for manufacturing alkylaluminum compounds from aluminum or alloys containing the same. More particularly, it is concerned with a method for manufacturing alkylaluminum compounds by allowing aluminum or an alloy containing the same to react with an alkylaluminum compound and hydrogen, or a mixture of them with an olefin, in the presence of a specific activating agent.

K. Ziegler et al. have suggested a method in which an alkylaluminum compound was directly manufactured by the reaction of aluminum with hydrogen or with hydrogen and an olefin, in the presence of the alkylaluminum compound. (See, for example, Angew. Chem., vol. 67, No. 16, 424 (1955); Ann. der Chem., vol. 629, 1 (1960); U.S. Patent No. 2,835,689; British Patent No. 770,707; German Patent No. 1,048,276; Japanese patent publication No. 5,710/1957.)

In such method, it is necessary to employ aluminum material from which aluminum oxide film firmly covering its surface has been removed, to secure speedy progress of the reaction. For that purpose, K. Zeigler et al. have suggested that the aluminum was finely divided or cut in a specific liquid prepared for the prevention from oxygen, for example, in a hydrocarbon solvent containing a small amount of an alkylaluminum compound, or that the aluminum in molten state was jetted into the specific liquid as mentioned above in the presence of an inert atmosphere. (See, for example, Ann. der Chemie, vol. 629, 1 (1960).) However, such method has some difficulties from economical point of view, especially when carried out in a large scale continuous process.

Besides such mechanical activation method, Elmer et al. have suggested a method in which inactive aluminum was chemically activated prior to the reaction by heat-treatment under superatmospheric pressure of hydrogen in the presence of an organometallic compound, such as alkylaluminum, arylaluminum and alkylberyllium, or a metal hydride, such as aluminum hydride and calcium hydride, at least at 150° C. but below the ultimate decomposition temperature of the organometallic compound or the metal hydride. (See, for example, British Patent No. 808,705; Japanese patent publication No. 7,-906/1959; U.S. Patent No. 2,921,876; British Patent No. 808,706; British Patent No. 808,707; Japanese Patent Publication No. 2,252/1959.) The present inventors have, however, found that, when the effectiveness of the activating agent suggested by Elmer et al. was examined by activating inactive aluminum with the agent at various temperatures, and then allowing the aluminum to react with a sufficient amount of trialkylaluminum and hydrogen for a defining period of time thereby to measure the reaction amount of the aluminum, the effectiveness was sufficiently high at an activating temperature higher than 190° C., but decreased rapidly as the temperature lowered below 190° C. While, experience informed the inventors that the activating agent itself was heat-decomposed at a temperature higher than 190° C. even under the super-atmospheric pressure of hydrogen to isolate the metal from the agent. The heat-decomposition of the activating agent is unfavorable by reason of loss of the agent and inhibition of the reaction.

Also, Elmer et al. have suggested a method in which inactive aluminum was activated by heat-treatment in the presence of an alkylaluminum compound added with a small amount of an activation-promoting agent, such as an alkali metal, an alkali-earth metal, and an oxide and a hydroxide thereof. (See, for example, U.S. Patent No. 2,892,738; Japanese patent publication No. 15,754/1960.) The inventors have examined the effectiveness of the activating agent of this method, and found that the effectiveness of the agent was positively kept at a sufficiently high degree and the promoting effect of the promoting agent was recognized, even when the activating temperature was lowered up to 150° C., but the effectivenesses were gradually decreased at a temperature lower than 150° C., and remarkably minimized at a temperature lower than 120° C. Even at a temperature higher than 150° C., it has been also found that a comparatively long activation period of time was needed to attain a sufficiently high effectiveness, if the temperature is not higher than 150° C. While, the alkylaluminum compound, the activating agent, tends to decompose even under a superatmospheric pressure of hydrogen, if the temperature is raised to a sufficient degree to secure the reduction of time needed for the activation.

As obvious from the above-mentioned, the mechanical activation method and the chemical activation method, as suggested heretofore, have difficulties in that the former is not adaptable to a large scale process and is expensive, and the latter is not avoidable from the heat-decomposition of the activating agent even though the effectiveness is somewhat improved by addition of an activation-promoting agent. Hence, it is an important problem to further improve the method of activating inactive aluminum, as suggested by Ziegler et al., to secure speedy progress of the formation reaction of alkylaluminum compounds.

Accordingly, one object of this invention is to provide a novel method for manufacturing alkylaluminum compounds which will avoid the above-mentioned difficulties. This and other objects will become apparent from the following description.

To accomplish these objects, the inventors provide a method for activating inactive aluminum and inactive aluminum alloy which comprises heating a member selected from the group consisting of inactive aluminum and alloys containing the same with an activating agent having the general formula of $R''_n MY$, wherein $R''$ is a member selected from the group consisting of alkoxy, aroxy, aralkoxy, alkaroxy, alkyl, aryl, aralkyl and alkaryl radicals, Y is a member selected from the group consisting of alkoxy, aroxy, aralkoxy and alkaroxy radicals, M is a metal element having atom valency of $n+1$, and $n$ is a whole number selected from 0, 1 and 2, up to a temperature ranging from 70° to 250° C. In another aspect, the inventors provide a method for manufacturing alkylaluminum compounds, which comprises allowing a member selected from the group consisting of aluminum and alloys containing the same to react with a member selected from the group consisting of a mixture of an alkylaluminum compound and hydrogen and a mixture of an alkylaluminum compound, hydrogen and an olefin, the said alkylaluminum compound having the general formula of RR'AlR''' wherein R and R' are respectively selected from alkyl radicals having 2 to 20 carbon atoms and R''' is selected from the group consisting of alkyl radicals having 2 to 20 carbon atoms and hydrogen atom, in the presence of a compound, as activating agent, having the general formula of R''$_n$MY wherein R'' is selected from the group of alkoxy, aroxy, aralkoxy, alkaroxy, alkyl, aryl, aralkyl and alkaryl radicals, Y is selected from the group of alkoxy, aroxy, aralkoxy and alkaroxy radicals, M represents a metal element having atom valency of $n+1$, and $n$ is a whole number selected from 0, 1 and 2.

The activating agent employed in the present invention is quite heat-stable, so that the heat-decomposition of the agent itself as occurs when alkylaluminum, arylaluminum, alkylberyllium, aluminum hydride or calcium hydride is not observed. For instance, FIGURE 1 attached exhibits amount of heat-decomposition gas generated when 15.0 g. of cut foil of an alloy having a composition of 60% by weight of aluminum, 34% by weight of silicon and 6% by weight of iron is mixed with 0.219 mole of di-isobutylaluminum hydride or di-isobutyl-n-butoxyaluminum and the mixture is kept at 190° C. As found from FIGURE 1, di-isobutyl-n-butoxyaluminum which is one of the activating agents employed in the invention has far superior heat-stability to di-isobutyl-aluminum hydride. All of the activating agents employed in the invention is as heat-stable at below 250° C. as di-isobutyl-n-butoxyaluminum.

Contrary to the prior activation method using alkyl-aluminum, arylaluminum, alkylberyllium, aluminum hydride or calcium hydride, which needs a superatmospheric pressure of hydrogen for the prevention of heat-decomposition, it is not necessary in the present invention to employ the super-atmospheric pressure of hydrogen because of a high heat-stability of the agent, though the activation may be effected under such pressure of hydrogen. Moreover, the activating agent employed in the invention has exceedingly high activating action to inactive aluminum and its alloys. Effectiveness of one of the activating agents, di-isobutyl-n-butoxyaluminum is set forth in the following table.

TABLE 1

| Activation [1] | | Preparation of alkyl-aluminum [2]—Conversion of aluminum [3], percent |
|---|---|---|
| Temp., ° C. | Time (hr.) | |
| 100 | 1 | 75 |
| 100 | 3 | 95 |
| 120 | 1 | 95 |
| 120 | 3 | 96 |
| 150 | 0.5 | 94 |
| 150 | 1 | 95 |
| 190 | 0.5 | 96 |
| 190 | 1 | 96 |

[1] Activation condition:
  Activating agent; (iso-C$_4$H$_9$)$_2$Al—O—(n-C$_4$H$_9$)
  Metal; Al(60 wt. percent)-Si(40 wt. percent) 16-24 mesh
  Atmosphere; N$_2$ normal pressure.
[2] Condition for the preparation of alkylaluminum:
  Temperature; 120° C.
  H$_2$ pressure; 100 kg./cm.$^2$
  Alkylaluminum; (iso-C$_4$H$_9$)$_3$Al
  Reaction time; 20 hours.
[3] Conversion of aluminum:
  $\frac{\text{Weight of Al reduced by the reaction}}{\text{Weight of Al charged}} \times 100$ As obvious from the table, heat-treatment of an aluminum-silicon alloy in the presence of di-isobutyl-n-butoxyaluminum, according to the invention, yields effective activation even under nitrogen atmosphere at normal pressure. Furthermore, the method of the invention can employ moderate temperature and time from economical point of view, since a sufficient activation is effected even at such a low temperature as 100° C. for such a short period of time as 3 hours. Other activating agents than di-isobutyl-n-butoxyaluminum, according to the present invention, yield similar results.

In carrying out the method of the invention, the process of activation of inactive aluminum or an alloy containing the same, and the process of manufacturing dialkylaluminum hydride or trialkylaluminum using the activated aluminum or its alloy, the corresponding alkylaluminum compound and hydrogen with or without an olefin, may naturally be conducted separately. However, it is convenient to conduct both processes at the same step, since the present activating agent possesses a high effectiveness and plays its role even at 100° to 200° C. at which temperature the process of manufacturing alkylaluminum compounds is conducted.

The activating agent employed in the present invention is represented by the general formula, R''$_n$MY, wherein R'' is selected from the group of alkoxy, aroxy, aralkoxy, alkaroxy, akyl, aryl, aralkyl and alkaryl radicals, Y is selected from the group of alkoxy, aroxy, aralkoxy and alkaroxy radicals, M represents a metal element having valency of $n+1$, and $n$ is a whole number selected from 0, 1 and 2. Typical examples of the agent include methoxy, ethoxy, n-propoxy, isopropoxy, n-butoxy, phenoxy, and p-tolyloxy compounds of lithium, sodium and potassium; dimethoxy, diethoxy, diisopropoxy, di-n-butoxy, methoxy-ethoxy, ethyl-ethoxy, diphenoxy, methyl-phenoxy, and ethyl-tolyloxy compounds of magnesium and zinc; trimethoxy, triethoxy, triisopropoxy, tri-n-butoxy, dimethoxy-ethoxy, methyl-dimethoxy, ethyl-diethoxy, dimethyl-methoxy, diethyl-ethoxy, n-butyl - di - n - butoxy, diisobutyl-n-butoxy, triphenoxy, tribenzyloxy, and methyl-diphenoxy compounds of boron and aluminum.

Aluminum and its alloys employed as material in the present invention may be any of commercially available products, such as finely divided aluminum and atomized aluminum or in various form such as shavings or cut foils from lathe and drilling machine, and cut fragments. Naturally, the aluminum and its alloy may have a film of aluminum oxide at their surface, caused by air or oxygen.

As to the aluminum alloy, the alloy including Si, Fe or Ti and others are preferably employed. In the case of Al-Si binary alloy, those having the composition of 13–60% by weight or Si and 40–87% by weight of Al, are preferred. In the case of multi-components alloys such as Al-Si-Fe or Al-Si-Fe-Ti, the alloys having the composition of 13–40% by weight of Si, 1–15% by weight of Fe, 0–10% by weight of Ti and the remaining amount being Al are preferred. And small amount of other metals such as Mg and Ca may be included in the alloy. Further, metals such as Al, Si and Fe or their carbide or oxide may be included in the alloy in the form of a mixture.

The alkylaluminum compound employed as one of materials employed in the present invention is represented by the general formula, RR'AlR''', wherein R and R' are respectively selected from akyl radicals having 2 to 20 carbon atoms and R''' is selected from the group consisting of akyl radicals and hydrogen atom, typical examples of which include triethylaluminum, diethylaluminum hydride, tri-n-propylaluminum, triisobutylaluminum, diisobutylaluminum hydride, and a mixture thereof.

As to the olefin employed in the present invention, α-olefins having 2 to 20 carbon atoms are preferred, typical examples of which include ethylene, propylene, n- and isobutylene, 2-methyl-1-pentene and 2-ethyl-1-hexene.

Olefins having internal double bond are very inactive, therefore they are not preferable, but they may be used as an inert diluent in the same meanings as other inert liquid medium.

The α-olefins employed in the present invention may be one kind or a mixture of more than one kind.

Then, reference will be made to the process of activation and the process of manufacturing alkylaluminum compound. In case of conducting both processes separately, inactive aluminum or its alloy is heat-treated directly with the activating agent or in a solution or suspension of the agent in a suitable liquid medium. The activated aluminum or its alloy is then allowed to react with an alkylaluminum compound and hydrogen with or without an olefin. To conduct the latter process, the activated aluminum or its alloy may or may not be separated from the activating agent or the liquid medium containing the same. The alkylaluminum compound to be added may be employed singly or as a mixture, or may be added in the course of the activation. The process of activation and the process of manufacturing of alkylaluminum compounds may be conducted in separate reaction vessels or in one vessel. The liquid medium as mentioned above may be any of inert organic soluents, such as hexane, heptane, benzene, toluene, xylene, acetone, diethyl ether, dipropyl ether, dibutyl ether, cyclohexane, Decalin, and the like, and a mixture thereof.

In case of conducting the both processes in one step, inactive aluminum or its alloy, an activating agent itself or in a solution or dispersion in a liquid medium, and an alkylaluminum compound are charged in a reaction vessel, and hydrogen with or without an olefin is introduced into the vessel to manufacture the corresponding alkylaluminum compound. In such step, activation of inactive aluminum or its alloy sufficiently proceeds even at such a low temperature as 100° to 200° C., and the alkylaluminum compound can be manufactured. Moreover, significantly high solubility of the activating agent to the aklylaluminum compounds serves for the acceleration of the activation. Thus, decrease of the hydrogen pressure, i.e. formation of alkylaluminum compound, is started when the temperature in the vessel is raised to a temperature higher than 100° C.

Among the activating agents according to the present invention, those which are liquid at the heating temperature, such as triisopropoxyboron, tri-n-butoxyboron, di-n-butyl-n-butoxyboron, triisopropoxyaluminum and diisobutyl-n-butoxyaluminum, may be employed in itself or as a solution or dispersion in a suitable liquid medium. But, those which are solid, such as the compound of sodium, potassium and magnesium, are preferably employed as a solution or dispersion in a liquid medium. In case where the liquid medium has a considerable vapor pressure at the heating temperature, an autoclave has to be employed as vessel. Amount of the activating agent employed is desirably at least 0.01% per amount of inactive aluminum or its alloy. In any event of using the activating agent singly or in the form of solution or suspension, or along with an alkylaluminum compound, it is desirable that aluminum or its alloy forms a slurry and can be well stirred, if it is a fine divided form. If it is in a form of shavings or cut foils, or fragments, it is desirably soaked in the reaction medium.

To ensure the efficient reaction, the reaction mixture is desirably agitated. The agitation may be effected by the well known mechanical stirring or by other suitable ways, such as circulation.

Suitable temperature ranges for the activation and the manufacture of the alkylaluminum compounds are 70° to 250° C. and 100° to 200° C., more preferably 100° to 200° C. and 100° to 150° C., respectively. If the both processes are conducted at once, the temperature range of 100° to 200° C., preferably 100° to 150° C., may be employed.

The activation is generally conducted under an inert atmosphere, such as nitrogen, argon and hydrogen.

The following examples are set forth merely by way of illustration and not by way of limitation.

Example 1

Into an autoclave which was flashed with nitrogen gas, 450 g. of sand granule like 16–24 mesh of aluminum alloy having a composition of 60.0% by weight of aluminum, 1.5% by weight of iron and 38.5% by weight of silicon, and 450 g. of diisobutyl-n-butoxyaluminum was charged, and the mixture was maintained at 150° C. for 1 hour while being stirred thereby to activate aluminum alloy.

After the activation was over the reaction mixture was cooled to room temperature and the diisobutyl-n-butoxyaluminum was discharged. Then, into the autoclave, 5150 g. of triisobutylaluminum was charged, and the reaction mixture was heated up to 120° C., while being stirred. Then, hydrogen gas was charged into the autoclave up to 100 kg./cm.$^2$ and the reaction was continued for 15 hours, while keeping the pressure at 100 kg./cm.$^2$ by supplying hydrogen gas as the pressure of the reaction system lowered.

After the reaction was over, the autoclave was cooled to room temperature and the pressure in the autoclave was reduced to atmospheric pressure, by discharging the gas in the autoclave. Taking out the reaction mixture, 5410 g. of a mixture of triisobutylaluminum and diisobutylaluminum hydride and 194 g. of metal residue were obtained.

The same procedure mentioned above was repeated except that 450 g. of tri-n-butoxyboron or 450 g. of triisopropoxyaluminum was used instead of diisobutyl-n-butoxyaluminum, and the similar results were obtained.

Example 2

Into an autoclave which was flashed with nitrogen gas, 270 g. of shavings of aluminum, 270 g. of xylene, and 0.27 g. of sodium ethoxide were charged and the mixture was maintained at 150° C. for 1 hour, while being stirred, thereby to activate the aluminum. After the activation was over, the reaction mixture was cooled to room temperature and the pressure in the autoclave was reduced to atmospheric pressure, by discharging the gas in the autoclave.

The xylene solution of sodium ethoxide was discharged, then 5,150 g. of triisobutylaluminum was charged into the autoclave and the mixture was heated up to 120° C. while being stirred, and hydrogen gas was charged into the autoclave up to 100 kg./cm.$^2$. The reaction was continued for 15 hours, while keeping the pressure at 100 kg./cm.$^2$ by supplying hydrogen gas as the pressure of the reaction system lowered.

After the reaction was over, the autoclave was cooled to room temperature and the pressure in the autoclave was reduced to atmospheric pressure by discharging the gas in the autoclave. Taking out the reaction mixture, 5,400 g. of a mixture of triisobutylaluminum and diisobutylaluminum hydride and 8.1 g. of metal residue were obtained.

Example 3

Into an autoclave which was flashed with nitrogen gas, 270 g. of finely powdered commercial aluminum powder, 270 g. of triisobutylaluminum and 0.27 g. of sodium ethoxide were charged and the mixture was maintained at 150° C. for 1 hour, while being stirred, thereby to activate the aluminum. After the activation was over the reaction mixture was cooled to room temperature and the pressure in the autoclave was reduced to the atmospheric pressure by discharging the gas in the autoclave.

Then, 5,150 g. of triisobutylaluminum was charged into the autoclave, and the mixture was heated up to 120° C., while being stirred. Hydrogen gas was charged into the autoclave up to 100 kg./cm.$^2$ and the reaction was continued for 6 hours, while keeping the pressure at 100 kg./cm.$^2$ by supplying hydrogen gas as the pressure of the reaction system lowered. After the reaction was over, the autoclave was cooled to room temperature and the pressure in the autoclave was reduced to atmospheric pressure, by discharging the gas in the autoclave.

Taking out the reaction mixture, 5,670 g. of a mixture of triisobutylaluminum and diisobutylaluminum hydride and 5.4 g. of metal residue were obtained.

Example 4

Into an autoclave which was flashed with nitrogen gas 450 g. of shavings of aluminum alloy having a composition of 60.0% by weight of aluminum, 10.2% by weight of iron and 29.8% by weight of silicon, 5,150 g. of triisobutylaluminum and 5.15 g. of lithium isopropoxide were charged, and the mixture were heated up to 120° C. while being stirred. Then, hydrogen gas was charged into the autoclave up to 100 kg./cm.$^2$ and the reaction was continued for 10 hours. The pressure in the reaction system began to decrease instantly when hydrogen gas was charged, and during the reaction the pressure was maintained at 100 kg./cm.$^2$ by supplying hydrogen gas as the pressure of the reaction system lowered. The decrease of pressure in the reaction system ceased after about 8 hours from the start of reaction. After the reaction was over, the autoclave was cooled to room temperature and the pressure in the autoclave was reduced to atmospheric pressure by discharging the gas in the autoclave.

Taking out the reaction mixture, 5,390 g. of a mixture of triisobutylaluminum and diisobutylaluminum hydride and 207 g. of metal residue were obtained.

Example 5

Into an autoclave which was flashed with nitrogen gas, 540 g. of powdered aluminum alloy, which was powdered in air, having the composition of 60.0% by weight of aluminum, 1.5% by weight of iron and 38.5% by weight of silicon, 45 g. of triisobutylaluminum and 4.5 g. of sodium n-butoxide were charged. The mixture was maintained at 100° C. for 3 hours, while being stirred, thereby to activate the powder of aluminum alloy. After the activation was over, the reaction mixture was cooled to room temperature and the pressure in the autoclave was reduced to atmospheric pressure by discharging the gas in the autoclave. Then, 2,180 g. of isobutylene was charged, and hydrogen gas was charged up to 70 kg./cm.$^2$, and the mixture was heated up to 120° C., while being stirred. The reaction was continued for 6 hours. The reaction pressure was kept at 100 kg./cm.$^2$ by supplying hydrogen gas as the pressure in the autoclave was lowered.

After the reaction was over, the autoclave was cooled to room temperature and the gas in the autoclave was discharged.

Then 270 g. of isobutylene was further charged into the autoclave and the reaction was continued for 1 hour at 70° C. After the reaction was over, the autoclave was cooled to room temperature and the pressure in the autoclave was reduced to atmospheric pressure by discharging the gas in the autoclave. Thus, 2,340 g. of triisobutylaluminum and 194 g. of metal residue were obtained.

The above mentioned procedure was repeated except using 4.5 g. of potassium phenoxide, 4.5 g. of di-n-butoxymagnesium or 4.5 g. of n-butyl-di-n-butoxyboron instead of 4.5 g. of sodium-n-butoxide and the similar results as mentioned above were obtained.

What we claim is:

1. A method for activating inactive aluminum and inactive aluminum alloy which comprises heating up to a temperature ranging from 70° to 250° C. a member selected from the group consisting of inactive aluminum and alloys containing the same with an activating agent having the general formula of $R''_n MY$, wherein $R''$ is a member selected from the group consisting of alkoxy, aroxy, aralkoxy, alkaroxy, alkyl, aryl aralkyl and alkaryl radicals, Y is a member selected from the group consisting of alkoxy, aroxy, aralkoxy and alkaroxy radicals, M is a metal element selected from the group consisting of lithium, sodium, potassium and magnesium, and $n$ is 0 when M is sodium, potassium or lithium and 1 when M is magnesium.

2. A method for manufacturing alkylaluminum compounds which comprises allowing a member selected from the group consisting of aluminum and alloys containing the same to react with a member selected from the group consisting of a mixture of an alkylaluminum compound, hydrogen and a mixture of an alkylaluminum compound, hydrogen and an olefin, the said alkylaluminum compound having the general formula of $RR'AlR'''$, wherein R and R' are respectively selected from alkyl radicals having 2 to 20 carbon atoms and R''' is selected from the group consisting of alkyl radicals having 2 to 20 carbon atoms and hydrogen atom, in the presence of a compound, as activating agent, having the general formula of $R''_n MY$ wherein $R''$ is selected from the group of alkoxy, aroxy, aralkoxy, alkaroxy, alkyl aryl, aralkyl and alkaryl radicals, Y is selected from the group consisting of alkoxy, aroxy, aralkoxy and alkaroxy radicals, M represents a metal element selected from the group consisting of sodium, lithium, potassium and magnesium, and $n$ is 0 when M is sodium, potassium or lithium and 1 when M is magnesium.

3. A method according to claim 1, wherein the activating agent is a member selected from the group consisting of methoxy-ethoxy, n-propoxy, isopropoxy, n-butoxy, phenoxy and p-tolyloxy compounds of a member selected from lithium, sodium and potassium.

4. A method according to claim 1, wherein the activating agent is a member selected from the group consisting of di-methoxy, di-ethoxy, di-isopropoxy, di-n-butoxy, methoxy-ethoxy, ethyl-ethoxy, di-phenoxy, methyl-phenoxy and ethyl-tolyloxy compounds of magnesium.

5. A method according to claim 2, wherein the alkylaluminum compound is a member selected from the group consisting of tri-ethylaluminum, di-ethylaluminum hydride, tri-n-propylaluminum, tri-isobutylaluminum and di-isobutylaluminum hydride.

References Cited

UNITED STATES PATENTS

| 2,831,898 | 4/1958 | Ecke et al. | 260—448 X |
| 2,845,447 | 7/1958 | Carlson et al. | 260—448 |
| 2,965,663 | 12/1960 | Smith | 260—448 |
| 3,050,540 | 8/1962 | Gould | 260—448 |
| 3,207,770 | 9/1965 | Ziegler et al. | 260—448 |
| 3,305,571 | 2/1967 | Cenker | 260—448 |
| 2,921,876 | 1/1960 | Dobratz. | |
| 3,077,490 | 2/1963 | Fernald | 260—448 |
| 3,100,786 | 8/1963 | Fernald | 260—448 |
| 3,324,160 | 6/1967 | Wright et al. | 260—448 |

TOBIAS E. LEVOW, *Primary Examiner.*

H. M. S. SNEED, *Assistant Examiner.*